No. 636,319. Patented Nov. 7, 1899.
P. R. CAMP.
TRANSPARENT PICTURE.
(Application filed Nov. 1, 1898.)
(No Model.)

Witnesses
E. H. Monroe

Paul R. Camp  Inventor
By his Attorneys,
C. A. Snow & Co.

THE NORRIS PETERS CO., PHOTO-LITHO., WASHINGTON, D. C.

UNITED STATES PATENT OFFICE.

PAUL R. CAMP, OF MARIETTA, GEORGIA.

TRANSPARENT PICTURE.

SPECIFICATION forming part of Letters Patent No. 636,319, dated November 7, 1899.

Application filed November 1, 1898. Serial No. 695,176. (No model.)

*To all whom it may concern:*

Be it known that I, PAUL R. CAMP, a citizen of the United States, residing at Marietta, in the county of Cobb and State of Georgia, have invented a new and useful Improvement in the Manufacture of Pictures, of which the following is a specification.

My invention relates to improvements in the art of manufacturing glass or composite pictures; and the object in view is to produce in a simple manner pictures wherein the distance of the several objects or representations of objects from the eye of the observer or the location of said object or representation in the depth of the field of the complete picture is represented by the location of different objects or representations upon surfaces arranged in different planes transverse to the line of vision, and thus to provide means for producing a perspective effect mechanically or by the actual difference in distance of different objects from the eye of the observer.

My invention consists, essentially, in applying (as by painting, coating, or otherwise) to separate transparent surfaces representations of objects which serve to make up a complete picture, different objects being arranged upon different surfaces and the surface upon which a representation is located being determined by the desired position of the represented object in the depth of the field in the complete picture, and then stacking the surfaces in their proper order, whereby the several representations upon the surfaces are simultaneously visible and combine to produce a picture wherein the objects in rear of the foreground are located at varying depths in the field of the picture and wherein the appearance varies, and the angle of the perspective is altered by a difference in the position of the eye of the observer with relation to the plane of the face of the picture.

Further objects and advantages of this invention will appear in the following description, and the novel features thereof will be particularly pointed out in the appended claims.

Figure 1:
Figure 2:
Figure 3:
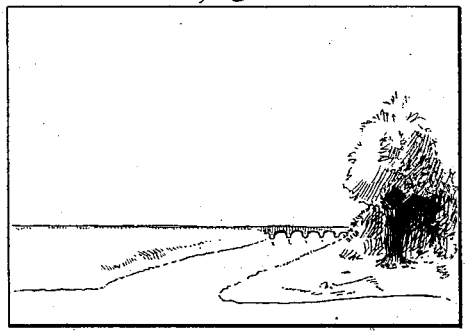
Figure 4:
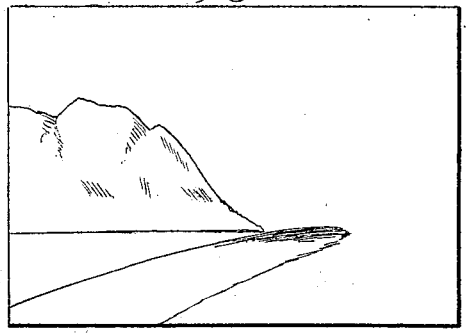
Figure 5:
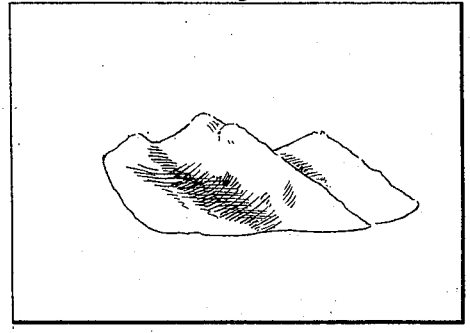
Figure 6:
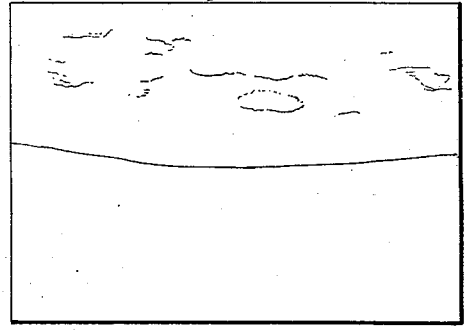
Figure 7:
Figure 8:
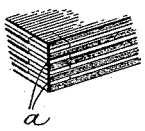

In the drawings, Figure 1 is a view of a complete picture constructed in accordance with my improved process. Figs. 2, 3, 4, 5, and 6 are views, respectively, of the different surfaces bearing the representations forming the component parts of the picture. Fig. 7 is a sectional view. Fig. 8 is a detail in perspective of one corner of the picture to show the spacing blocks or washers interposed between the adjacent surfaces or sheets.

In producing a picture in accordance with my invention I preferably coat, paint, impress, or otherwise apply to a transparent surface, preferably of glass or equivalent material, a representation of one or more objects to appear in the complete picture and combine therewith one or more similarly-prepared surfaces to which have been applied representations of other objects also designed to appear in the complete picture, the objects represented upon the different surfaces being arranged in any desired positions with relation to the area of said surface and having any desired coloring to suit the subject and the appearance which it is desired to produce. These surfaces bearing representations forming the component parts of the complete picture are then stacked or arranged one in front of the other in series, with the surface bearing the representation of objects in the foreground arranged foremost and those surfaces bearing representations of objects respectively farther from the foreground being arranged in the order in which they are to appear, while that surface upon which is represented the background is arranged rearmost. Thus the representations of the different objects which are to appear in the complete picture are arranged in different planes, the surface upon which a representation is located being determined by the desired position of the represented object in the depth of the field in the complete picture or the distance of said represented object from the eye of the observer. Owing, however, to the fact that the representations of the objects are arranged in different planes and transparent mediums being employed as the surfaces, it is obvious that an object represented upon a rear surface may be complete in detail and may be visible through intervals or openings in an object represented upon a surface in front of the first-mentioned surface, although the object on the front or second-named surface may completely or only partially cover the object on the first-named surface. For instance, a building represented upon one surface may be wholly or partially covered by a tree represented upon a second surface in front of the first-named surface, said building being partially visible through the intervals between the branches of the tree; but by reason of the different planes of the representations it is obvious that the observer by changing his position may see more or less of an object which is represented upon one of the rear surfaces. For instance, taking the foregoing illustration, if the building upon the rear surface is practically covered by a tree represented upon a surface in front thereof the observer by changing his position may see more of the building by observing the building from an angle. Objects represented upon rear surfaces will thus appear more or less distinctly according to the position of the observer with relation to the picture, and in this way a change of position of the observer will alter the angle of perspective of the picture, thereby producing an effect upon the eye which closely resembles the change of perspective in a landscape or other scene when the position of the observer is changed with relation to the objects in the scene or landscape. It is obvious that this effect will be produced to a greater or less extent according to the relative distances between the plane of the surfaces upon which the objects of the picture are represented and also by the thickness of the mediums or sheets of glass forming the surfaces to which the representations are applied. In practice, however, I prefer to employ thin sheets of transparent material, such as glass, and space them apart the desired intervals to give the required depth to the field of the picture, and in the construction illustrated this spacing of the surfaces is accomplished by means of blocks $a$ introduced between the sheets near the angles thereof. It will be obvious, however, that these spacing-blocks may be of different depths to vary the intervals between the surfaces of the same picture. For instance, where the foreground and the objects represented upon a surface just in rear of the foreground may be separated a considerable distance from the objects in the background it may be desirable to employ spacing-blocks of considerable length between the surfaces upon which the foreground representations are arranged and those to which the background is applied. After arranging the surfaces as described they may be clamped or otherwise permanently secured in a frame.

It will be understood that pictures prepared in accordance with the above process are characterized by a field of depth or distance due to the actual difference in distance of the objects from the eye of the observer and the difference in the number of transparent mediums through which the several objects are viewed. Furthermore, in preparing the picture it is not necessary to terminate an object in the background at the edge of an object in the foreground where the said foreground object overlaps the background object, or, in other words, it is not necessary to make the representations forming the component parts of the picture fit or dovetail into each other. On the other hand, each surface may be provided with a representation of a section of a scene as such portion or section would be viewed if the foreground objects were not present. Those portions of a background object of section which fall in rear of foreground objects will be cut out to the extent of the surface of such foreground object, and hence when the position of the observer is changed the perspective of the picture is changed without betraying an unfinished condition of the background.

Having described my invention, what I claim is—

1. The process of producing composite pictures, which consists in applying to separate transparent surfaces representations of the various objects which make up the complete picture, each surface bearing representations of objects different from the other surfaces, and then stacking the surfaces, the surface upon which a representation is located being determined by the desired position of the represented object in the depth of the field in the complete picture, substantially as specified.

2. The process of producing composite pictures, which consists of applying to separate parallel transparent surfaces representations of the various objects which make up the complete picture, each surface bearing representations of objects different from the other surfaces, and then stacking the transparent surfaces, the surface upon which a representation is located being determined by the desired position of the represented object in the depth of the field in the complete picture, substantially as specified.

3. The process of producing composite pictures, which consists of applying to separate sheets of light-penetrable glass representations of the various objects which make up the complete picture, each sheet of glass bearing representations of objects different from the other sheets of glass, and then stacking the sheets of glass, the sheet upon which a representation is located being determined by the desired position of the represented object in the depth of the field in the complete picture, substantially as specified.

4. As an article of manufacture, a composite picture consisting of a plurality of transparent mediums arranged in parallel planes and each bearing representations of objects different from the other mediums, the medium upon which an object is represented being determined by the desired position of that object in the depth of the field in the complete picture, substantially as specified.

5. As an article of manufacture, a composite picture consisting of a plurality of separate stacked transparent sheets, respectively bearing representations of different objects, the sheet upon which a representation is located being determined by the desired position of the represented object in the depth of the field in the complete picture, substantially as specified.

6. As an article of manufacture, a composite picture consisting of a plurality of stacked sheets of glass respectively bearing representations of different objects, the sheet upon which a representation is located being determined by the desired position of the represented object in the depth of the field in the complete picture, substantially as specified.

7. As an article of manufacture, a composite picture consisting of a plurality of stacked transparent mediums respectively bearing representations of different objects, and means for spacing said mediums at intervals, the medium upon which a representation is located being determined by the desired position of the represented object in the depth of the field in the complete picture, substantially as specified.

8. As a new article of manufacture, a composite picture consisting of a plurality of parallel stacked transparent mediums, respectively bearing simultaneously visible representations of different objects, and spacing-blocks interposed between adjacent mediums upon which a representation is located, substantially as specified.

9. As an article of manufacture, a composite picture consisting of a plurality of stacked transparent mediums bearing simultaneously visible representations of different objects combining to form the complete picture, each medium bearing representations of objects different from the other mediums, substantially as specified.

In testimony that I claim the foregoing as my own I have hereto affixed my signature in the presence of two witnesses.

PAUL R. CAMP.

Witnesses:
JOHN D. WHITE,
W. R. MONTGOMERY.